Feb. 2, 1960 R. L. ELLSWORTH 2,923,840
WAVE SHAPING CIRCUIT
Filed July 18, 1958
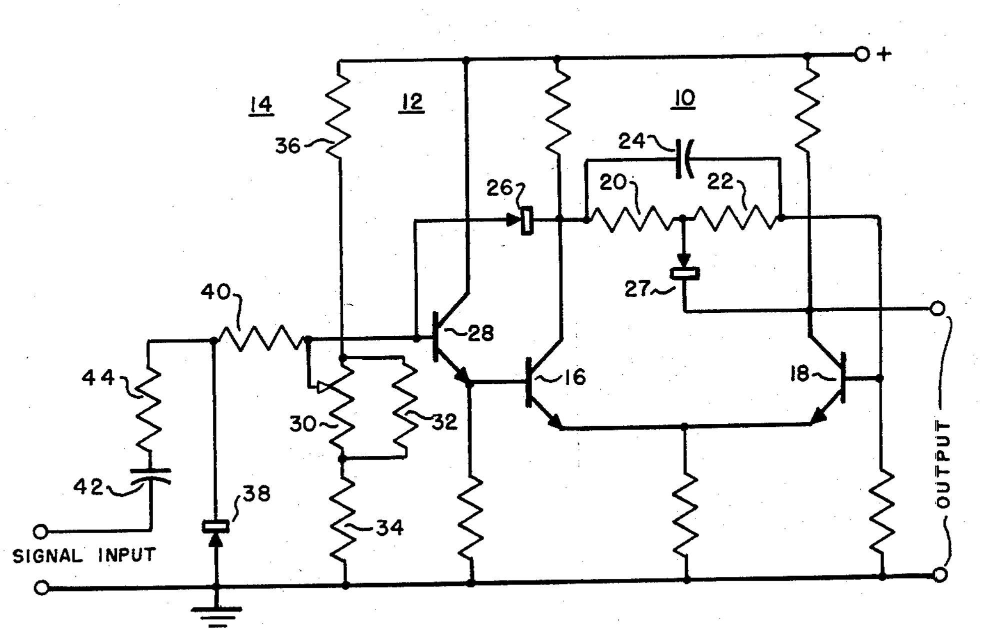
INVENTOR,
ROBERT L. ELLSWORTH.
BY Harry M. Saragovitz
ATTORNEY.

United States Patent Office 2,923,840

Patented Feb. 2, 1960

2,923,840

WAVE SHAPING CIRCUIT

Robert L. Ellsworth, Berkeley, Calif., assignor to the United States of America as represented by the Secretary of the Army Application July 18, 1958, Serial No. 749,573

2 Claims. (Cl. 307—88.5)

This invention relates to wave shaping devices, and particularly to wave shaping devices employing regenerative circuits, such as monostable multivibrators, which are capable of assuming one of two conduction states depending upon the amplitude of an input control voltage.

There are many applications such as in frequency counting circuits where it is necessary to provide uniform output voltage pulses in response to a fairly wide range in amplitude of input signals. It is the object of this invention to provide an improved means of performing this function.

In accordance with the invention a shaping circuit is constructed to employ a voltage level sensing device which will provide either of two output voltage levels depending on whether the input signal level is above or below a critical switching level of the device. A variable biasing means is provided for the input of the regenerative circuit by which both the sensitivity (to switching from one level to another) may be adjusted, and either a relatively high or relatively low static or resting output level may be selected. This finds an application where it is necessary or desirable to make the shaping circuit responsive to either the relatively positive or relatively negative portion of an input signal; as the shaping circuit can be set to respond with a pulse the leading edge of which corresponds in time to a point on the positive-going portion of an input signal and the trailing edge to a corresponding amplitude point on the negative-going portion of the input signal, or vice versa. Means are provided to limit signal excursions in either a positive or negative direction and it has been found that this may be ideally accomplished with a single Zener or breakdown diode connected across the input of the circuit. The effect of the diode is to limit the total signal swing to an amount equal to and of the same sign (positive or negative) as the Zener or breakdown voltage of the diode. Voltages of a sign opposite to the Zener voltage will represent forward voltages to the diode and will be by-passed or clipped regardless of amplitude.

The features of my invention which I believe to be novel are set forth with particularity in the appended claims. The invention itself, however, both as to its organization and method of operation, together with further objects and advantages thereof, may best be understood by reference to the following description taken in conjunction with the accompanying drawing showing a schematic circuit diagram of an embodiment of the invention.

Referring now to the drawing, there is shown a regenerative type voltage level sensing device 10 preceded by level setting and driver stage 12, and limiter stage 14. The voltage level sensing device 10 consists of two transistors 16 and 18 regeneratively coupled in an emitter coupled arrangement. The collector (output) of transistor 16 is connected to the base (input) of transistor 18 through resistors 20 and 22 which are shunted by capacitor 24. An output voltage from transistor 18 is coupled back to transistor 16 by direct connection of emitter to emitter. Resistors 20 and 22 form a voltage divider circuit for the coupling of a portion of the collector voltage of transistor 18 back to the base of transistor 18 via diode 27 whenever the collector voltage falls below a certain point. The operation of this diode and diode 26 connected between the collector of transistor 16 and base of transistor 28 which operates similarly will be discussed later.

The level setting and driver stage 12 consists of transistor 28 connected as an emitter follower with its emitter being directly coupled to the base of transistor 16, the input transistor of the level sensing circuit. The base of transistor 28 is connected to the adjustable arm of a potentiometer 30 which, with resistors 32, 34 and 36, form a voltage divider circuit connected to a bias source for adjusting the static or resting level of the level sensing circuit by adjusting the operating level of transistor 28.

Limiter stage 14 consists principally of Zener or breakdown diode 38 which is connected through isolating resistor 40 between the base input of transistor 28 and a common ground reference point. As shown, the diode is poled to short out or bypass negative voltages and to limit or clip positive voltages greater than the diode breakdown voltage. Input signals are applied through input capacitor 42 and resistor 44 to limiter 14 and level setting stage 12. Inasmuch as the diode is direct current coupled to the level setting bias source, the input signal which is capacitively coupled to the diode will be presented to the limiter superimposed on a direct current voltage level, which level will depend upon the level setting adjustment of potentiometer 30. The points of limiting will then be determined by the composite voltage of bias and signal and, accordingly, the portion of the input signal which is limited will vary with adjustment in bias level. However, with this circuit no interference from the limiter will occur in the critical region adjacent to the triggering point of sensing device 10.

Two modes of operation of the illustrated circuit are intended, one with the first stage transistor 16 of sensing device 10 "cut-off," and thus below triggering level, and one mode in which the first stage transistor is "on," i.e., above triggering level. The first mode will exist when the adjustable contact of potentiometer 30 is adjusted approximately above its mid-point and the second mode will occur when this contact is adjusted below the potentiometer mid-point. The mid-point adjustment therefore corresponds approximately to the triggering-detriggering crossover point of level sensing device 10.

To consider the first mode of operations, with the bias set below the triggering point, a positive-going voltage will result in a rise in the voltage level on the base of transistor 16 and the collector voltage of that transistor will start to drop. This causes a decrease in the voltage level of the base of transistor 18, and the collector current thereof commences to decrease. With this decrease in collector current, the change in current in the common emitter circuit reinforces the input signal, starting a regenerative action and causes the device to assume a second and quasi-stable state. The collector voltage of transistor 18 has been changed from a low level to a relatively high level. When the input to transistor 16 is reduced to the detrigger point, the circuit is restored and the collector voltage of transistor 18 assumes its original, relatively low, voltage level.

Operation in the second mode is similar except that the level is initially adjusted above the triggering point and the order of triggering and detriggering is reversed.

Diodes 26 and 27 provide an automatic non-saturating feature which may be explained as follows. Assume the worst possible condition of saturation insofar as transistor 16 is concerned in which potentiometer 30 is adjusted up so that a large positive voltage will exist at the base of transistor 16. Assume further that transistor 16 has a high gain and is operated at a high temperature which further increases the gain. Under these conditions, the collector voltage is very low with respect to the base and emitter, causing saturation. However, diode 26, connected between the collector of transistor 16 and the base of transistor 28, conducts when the collector voltage of transistor 16 drops below the base voltage of transistor 28. The resulting feedback voltage at the base of transistor 28 is coupled to the base of transistor 16 by transistor 28 and this drives the voltage at the base and emitter of transistor 16 down, thus pulling the collector of transistor 16 out of the region of saturation. Diode 27 operates similarly. When the collector voltage of transistor 18 approaches the region of saturation, diode 27 condcts, preventing the base voltage of transistor 18 from further increasing in the positive direction. This limits the positive excursion of the base voltage on transistor 18 before collector saturation occurs. All transistors are of the same conductivity type. The nonsaturating circuitry substantially minimizes the effect of differences in individual transistors of the same type as well as minimizing the effect of marked changes in transistor characteristics with change in temperature.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave shaping circuit having input and output circuits for providing either of two output voltages at said output circuit depending upon whether the signal level at said input circuit is above or below a critical level, comprising sensing means having a first and second transistor amplifier, a coupling impedance, the collector output of said first transistor amplifier being connected through said coupling impedance to the base input of said second transistor amplifier, the emitter output of said second transistor amplifier being connected to the emitter input of said first transistor amplifier; adjustable biasing means being connected to the input of said sensing means through a transistor emitter follower amplifier, the emitter output of said emitter follower amplifier being direct current coupled to the base input of said first transistor amplifier, and the base input of said emitter follower amplifier being direct current coupled to the output of said adjustable biasing means for providing a direct current bias which may be adjusted above or below said critical level; signal input means for applying an input signal to said input of said sensing means; and a Zener diode, direct current connected across said adjustable biasing means for limiting the amplitude of said input signal in both positive and negatve directions.

2. A wave shaping circuit as set forth in claim 1, wherein said coupling impedance comprises first and second resistors in series and a capacitor, connected across said resistors, said circuit further comprising first and second rectifiers, said first rectifier being connected between the junction of said first and second resistors and the collector of said second transistor, said first rectifier being poled to pass current in the same direction as the collector of said second transistor, said second rectifier being connected between the collector of said first transistor and the base of said transistor emitter follower, the terminals of said second rectifier being connected to like polarity transistor terminals and said first and second transistors and said transistor emitter follower all being of the same conductivity type.

References Cited in the file of this patent

UNITED STATES PATENTS

| | | |
|---|---|---|
| 2,827,574 | Schneider | Mar. 18, 1958 |
| 2,840,727 | Guggi | June 24, 1958 |
| 2,841,712 | Hoge et al. | July 1, 1958 |

FOREIGN PATENTS

| | | |
|---|---|---|
| 1,122,425 | France | May 22, 1956 |